US007127335B2

(12) United States Patent
Tschepen et al.

(10) Patent No.: US 7,127,335 B2
(45) Date of Patent: Oct. 24, 2006

(54) LOW AIRSPEED ASSIST ALGORITHM FOR AIR DATA COMPUTER APPLICATIONS

(75) Inventors: Tracey P. Tschepen, Burnsville, MN (US); Zachary Alexander Caron, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 297 days.

(21) Appl. No.: 10/396,165

(22) Filed: Mar. 25, 2003

(65) Prior Publication Data

US 2004/0193333 A1 Sep. 30, 2004

(51) Int. Cl.
*G08B 23/00* (2006.01)
(52) U.S. Cl. .......................... 701/7; 340/969; 340/977; 73/180; 73/528; 73/727; 244/752
(58) Field of Classification Search .................... 701/7; 340/945, 966, 967, 968, 970, 973, 974, 977, 340/969, 949, 963; 244/538, 181, 17.13, 244/77 D, 76, 178, 75 R, 182; 73/528, 727, 73/170.02, 170.11, 170.14, 180
See application file for complete search history.

(56) References Cited

U.S. PATENT DOCUMENTS 4,702,106 A  10/1987  Hassenpflug et al. ........ 73/181
5,349,347 A * 9/1994  Muller ........................ 340/969
5,457,630 A * 10/1995 Palmer ........................... 701/3
5,616,861 A *  4/1997 Hagen ........................... 73/180
5,901,272 A *  5/1999 Schaefer et al. ............. 706/17
6,205,376 B1 * 3/2001 Gordon ......................... 701/4
6,561,020 B1 * 5/2003 Glenney ................. 73/170.02
6,588,285 B1 * 7/2003 Vozhdaev et al. ......... 73/861.65
6,604,029 B1 * 8/2003 Cronin et al. .................. 701/6
6,688,182 B1 * 2/2004 Kurtz et al. ................... 73/727
2002/0131864 A1 * 9/2002 Vos et al. ...................... 416/25
2002/0166375 A1 * 11/2002 Cronin et al. ............ 73/170.02
2002/0171563 A1 * 11/2002 Djorup ......................... 340/968
2003/0050766 A1 * 3/2003 Cronin et al. ............... 702/181

FOREIGN PATENT DOCUMENTS

EP           321876 A2 *  6/1989
EP           482250 A1 *  4/1992
JP           10227808      8/1998

* cited by examiner

*Primary Examiner*—Jack Keith
*Assistant Examiner*—Tuan C To
(74) *Attorney, Agent, or Firm*—Westman, Champlin & Kelly, P.A.

(57) ABSTRACT

A method of estimating the airspeed of an aircraft during low airspeed conditions includes measuring a negative impact pressure using a pitot-static probe on the aircraft. Then, the method includes estimating a non-zero airspeed of the aircraft as a function of the measured negative impact pressure.

11 Claims, 6 Drawing Sheets

Figure 5: Steps to Calculate Low Airspeed Assist (Data and Graphs)

| Uncorrected Qc (InHg) | 1. Uncorrected Airspeed (kts) | Biased Qc (Qc–Bias) (InHg) | 2. Biased Airspeed (kts) | 3. Target Airspeed (kts) | 4. LAA Airspeed (kts) |
|---|---|---|---|---|---|
| -0.24 | 0.00 | -0.03 | 0.00 | 0.00 | 0.00 |
| -0.20 | 0.00 | 0.01 | 15.16 | 2.00 | 2.43 |
| -0.16 | 0.00 | 0.05 | 32.95 | 6.00 | 5.66 |
| -0.11 | 0.00 | 0.09 | 44.05 | 10.00 | 10.14 |
| -0.07 | 0.00 | 0.13 | 52.87 | 17.00 | 15.99 |
| -0.03 | 0.00 | 0.18 | 60.40 | 23.06 | 23.11 |
| 0.02 | 21.92 | 0.23 | 69.22 | 31.70 | 34.11 |
| 0.11 | 47.47 | 0.32 | 80.97 | 54.45 | 52.23 |
| 0.21 | 66.62 | 0.42 | 93.44 | 71.79 | 72.08 |
| 0.34 | 83.86 | 0.55 | 106.36 | 87.47 | 88.35 |
| 0.39 | 90.40 | 0.60 | 111.56 | 93.60 | 93.54 |
| 0.48 | 100.01 | 0.69 | 119.44 | 102.38 | 101.46 |
| 0.58 | 110.03 | 0.79 | 127.91 | 111.60 | 112.06 |
| 0.70 | 120.00 | 0.90 | 136.54 | 120.80 | 120.68 |

LOW AIRSPEED ASSIST ALGORITHM FOR AIR DATA COMPUTER APPLICATIONS

BACKGROUND OF THE INVENTION

The present invention relates to air data computers (ADCs) or systems, and algorithms implemented therein, for use in helicopters or other rotorcraft. More particularly, the present invention relates to a Low Airspeed Assist (LAA) method, and ADCs or systems implementing the same, to provide more accurate airspeed information in helicopters or other rotorcraft at low airspeeds.

Air data systems on helicopters and other rotorcraft include one or more pitot-static probes, an air data computer connected to the pitot-static probe(s), and other sensors if desired. The pitot-static probe(s) are mounted toward the front end of the helicopter, and are used to sense or calculate total pressure Pt and static pressure Ps If the aircraft utilizes more than one pitot-static probe, Pt is the average total pressure and Ps is the average static pressure measurement. As is known in the art, impact pressure (also referred to as dynamic pressure and commonly denoted Qc) can be calculated by subtracting the static pressure Ps from the total pressure Pt. These pressure measurements are most accurate when the pitot-static probe is properly placed on the aircraft to minimize aerodynamic errors from the vehicle, and when the pitot-static probe is sensing pitot and static pressure in a pressure field created only by the forward velocity of the vehicle and is free of the rotor downwash effect seen during slow flight, take-offs, and landings.

At low airspeeds, the impact pressure readings from the pitot-static probe(s) are affected by downwash from the main rotor into the static ports of the pitot-static probe(s), by high pressure fields beneath the rotor, and by the local pitch of the aircraft during takeoff. These effects cause the impact pressure reading to be less than the free stream impact pressure, thus resulting in negative values of impact pressure during such an event.

Conventionally, the impact pressure Qc is calculated as indicated above, and then that impact pressure is converted to an airspeed using known techniques. Using conventional techniques, with a negative impact pressure, calculated airspeed will be zero even though the helicopter in fact has a non-zero airspeed. As the helicopter increases in airspeed, relative to the helicopter, the downwash angles back toward the rear of the aircraft. At some minimum airspeed for the particular helicopter and flight conditions, the downwash moves completely behind the pitot-static probe(s), allowing accurate pressure measurements of impact pressure for use in the airspeed calculation.

During takeoffs and landings, it is important for estimated airspeeds to be readable and repeatable. Conventionally, measured helicopter airspeeds have only been accurate and repeatable when they have surpassed the minimum airspeed mentioned above, at which the downwash angles behind the pitot-static probe(s), relative to the helicopter. A minimum airspeed that is important to helicopter pilots is the Take Off Safety Speed (TOSS). The TOSS is the speed at which the aircraft will safely take to the air. This speed varies with aircraft, takeoff weight, air temperature, etc. An improved method of estimating helicopter airspeeds while the calculated impact pressure is still negative and the aircraft is accelerating through the Critical Decision Point (CDP—a point along the flight path that dictates the decision point on where to land, should landing be necessary) would be a significant improvement in the art.

SUMMARY OF THE INVENTION

The present invention includes methods of calculating the airspeed of rotary wing aircraft at low airspeeds in which impact pressure readings from the pitot-static probe(s) are affected by downwash from the main rotor, by high pressure fields beneath the rotor, and/or by the local pitch of the aircraft during takeoff. When these effects cause the impact pressure reading to be less than the free stream impact pressure, thus resulting in negative values of measured -or calculated impact pressure, the methods of the present invention can be used to estimate actual airspeed by estimating non-zero airspeed values as a function of the negative impact pressure. The present invention also includes air data computers and systems configured to implement the methods disclosed herein.

The method of estimating airspeed of an aircraft during low airspeed conditions includes measuring a negative impact pressure using a pitot-static probe on the aircraft. Then, the method includes estimating a non-zero airspeed of the aircraft as a function of the measured negative impact pressure.

In some embodiments, estimating the non-zero airspeed of the aircraft further comprises estimating the non-zero airspeed of the aircraft as a function of an impact pressure bias. The impact pressure bias is an uncorrected impact pressure when an actual airspeed of the aircraft is zero during a maneuver which results in a weight-on-wheels for the aircraft being zero.

In some embodiments, estimating the non-zero airspeed of the aircraft further includes estimating the non-zero airspeed of the aircraft using a curve fit equation which relates negative impact pressure values directly to non-zero airspeed values.

In other embodiments, estimating the non-zero airspeed of the aircraft further includes calculating a positive corrected impact pressure value as a function of the measured negative impact pressure value. Then, the non-zero airspeed of the aircraft is estimated as a function of the positive corrected impact pressure value.

DETAILED DESCRIPTION OF THE PREFERRED EMBODIMENTS

The present invention includes a Low Airspeed Assist (LAA) method and algorithm, and an air data computer (ADC) and system implementing the same, to provide more accurate airspeed information in helicopters or other rotorcraft at low airspeeds. For example, the present invention can be used at airspeeds below the Critical Decision Point (CDP) and the Take Off Safety Speed (TOSS). The algorithm uses helicopter flight test data from actual performed takeoffs and landings (Rolling, CAT A, CAT Vertical, etc.) and from level flight at varied airspeeds, which is compared with a reference airspeed. The reference airspeed can be obtained, for example, using a trailing bomb (an air data probe suspended from the aircraft such that it is deployed outside the aircraft's airstream), calibrated nose boom, or a fixed airspeed course for the level flight constant airspeed tests. For the take off and landing flight tests it is common to use on-field radar or the helicopter nose boom for the airspeed or Qc reference. The effected impact pressure Qc (also known as dynamic pressure) is fit to the results in the flight test airspeed. In embodiments described herein, the algorithm then uses polynomial curve fit, for example between $2^{nd}$ order and $6^{th}$ order polynomial fit, to convert the resulting impact pressure data, including negative values, directly to airspeeds. Higher order polynomial curve fits can also be used.

Figure 1:
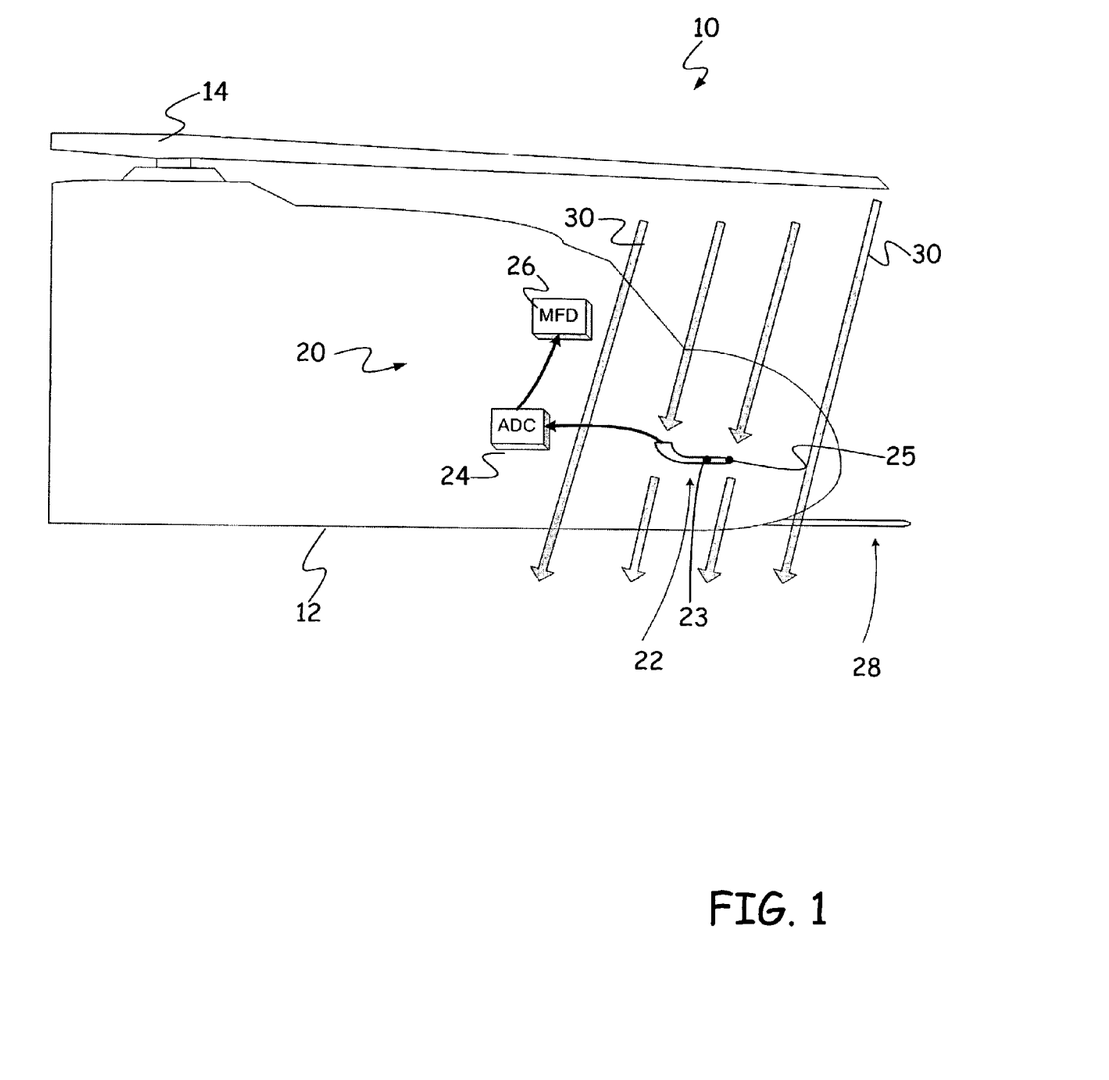
FIG. 1 is a diagrammatic side view of a helicopter in a low airspeed condition in which the pitot-static probe is in the rotor downwash.

FIG. 1 is a diagrammatic side view of a helicopter (or other rotorcraft) 10 during a low airspeed situation, such as a takeoff, landing, slow level flight, or slow flight in steep climb (for example greater than 1,500 ft/min). Helicopter 10 includes a body 12 and a rotor 14. The helicopter 10 also includes an air data system 20 having at least one pitot-static probe 22 connected to an ADC 24. A multi-function display (MFD) 26 is coupled to the ADC 24 and displays airspeed and other necessary information to the pilot of helicopter 10. Pitot-static probe 22 can be of a type known in the art which includes static pressure sensing ports 23 (due to the illustrated view, only one static port shown in FIG. 1) on opposite sides of the probe, and a total pressure sensing port 25 at a front end of the probe. Typically, more than one pitot-static probe 22 (for example 22-1 and 22-2 shown in FIG. 3) are used in an air data system 20.

Also as is known in the art, ADC 24 utilizes the sensed total pressure Pt and the sensed or calculated static pressure Ps (typically where Ps is the average pressure between the two static pressure sensing ports 23) to calculate the impact pressure Qc. At airspeeds above some minimum airspeed which is aircraft and flight condition dependent, ADC 24 also uses conventional techniques to calculate or estimate the airspeed as a function of the impact pressure Qc.

Figure 2:
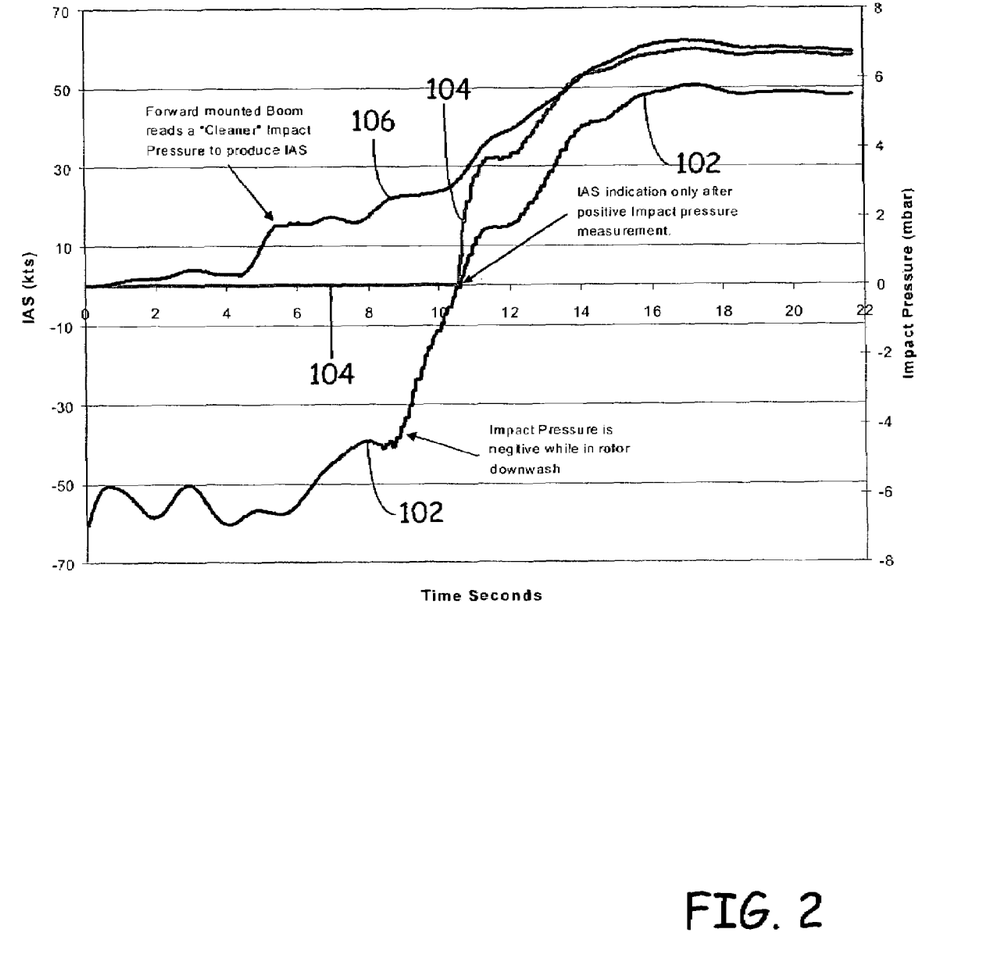
FIG. 2 is a graph illustrating measured impact pressure (dynamic pressure) verses target airspeed during takeoff under one set of flight conditions for a particular helicopter.

Consider for the moment that helicopter 10 is in a takeoff situation. As helicopter 10 adds power in preparation for an aggressive take-off, a positive pressure is applied to the static ports 23 of the pitot-static probe 22 due to downwash (represented by arrows 30) from the main rotor 14. FIG. 2 is a graph plotting impact pressure Qc (represented by curve 102) as a function of indicated airspeed (IAS) for one particular example helicopter and set of flight conditions. As can be seen in FIG. 2, due to the downwash 30 from the main rotor 14, the calculated impact pressure Qc is in fact negative until the helicopter reaches a sufficient airspeed.

Curve 104 in FIG. 2 illustrates the indicated airspeed when estimated or calculated using the impact pressure Qc obtained from the pressures sensed by pitot-static probe 22. Curve 106 illustrates the indicated airspeed for the same helicopter as calculated using a "cleaner" impact pressure. This "cleaner" impact pressure can be obtained, for example, using a pitot-static probe mounted on a boom 28 (FIG. 1) forward of the helicopter by a distance sufficient to place the probe outside of the rotor downwash 30 during these low airspeed operating conditions. As can be seen in FIG. 2 by comparing curve 104 and 106, the calculated airspeed has conventionally been zero (curve 104) while the impact pressure Qc (curve 102) is negative, when in fact, the actual indicated airspeed (curve 106) is positive.

As the helicopter begins to accelerate and the rotor downwash begins to move aft of the aircraft, the impact pressure Qc begins to increase as can be seen in curve 102 of FIG. 2. As the helicopter accelerates in this example through about 30 knots (kts), a positive impact pressure is sensed by the side mounted pitot-static probes 22, and an airspeed indication is now obtainable, although typically with significant error until the rotor downwash is well aft of the vehicle. For instance, in this example, while a positive impact pressure is calculated using the pitot-static probe data when the aircraft's actual airspeed is about 30 knots, the airspeed at which significant error is no longer present in the impact pressure measurement is approximately 45 knots. This airspeed is aircraft and flight condition dependent.

Figure 4:
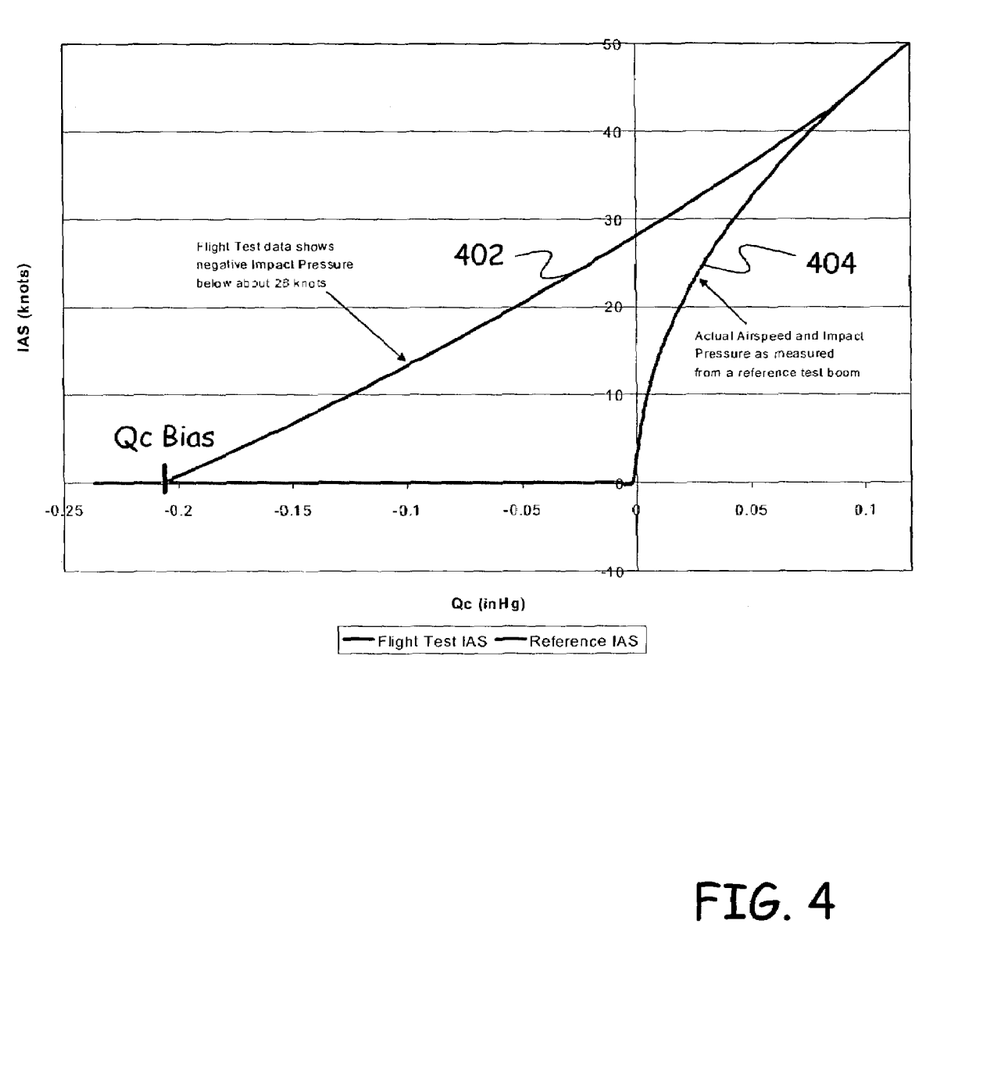
FIG. 4 is a graph illustrating flight test data verses reference airspeed.

It is important to note that, to obtain the measured impact pressure, a digital filter should be used in order to smooth the data before computations are performed. The data illustrated in FIG. 2 is post filtered data. While any of a wide number of digital filters can be used to filter the data, the filter used to obtain the best results during research of the invention was a $5^{th}$ order IIR Inverse Tschebyscheff Digital filter. This filtering can be implemented in processing circuitry within ADC 24, for example. An additional graph plotting airspeed versus impact pressure is shown in FIG. 4, and is used along with FIGS. 6A and 6B to illustrate a method of the present invention.

Figure 3:
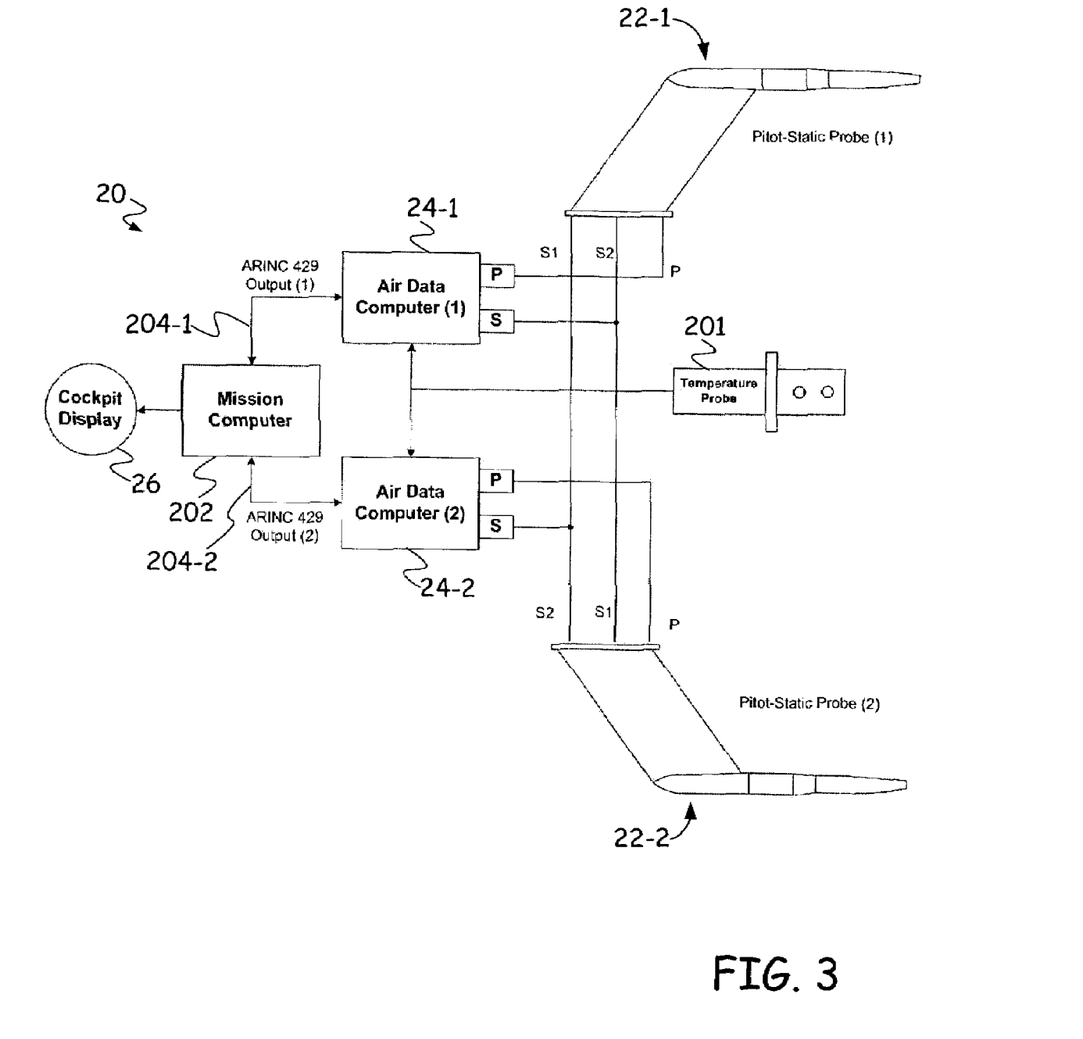
FIG. 3 is a block diagram illustrating an air data system in which a method of the present invention can be implemented.

Referring now to FIG. 3, shown is a block diagram illustrating an embodiment of air data system 20 in accordance with one more specific embodiments of the invention. The more specific embodiment illustrated in FIG. 3 is, however, provided only as an example. Air data systems illustrating components other than those shown in FIG. 3 also fall within the scope of the present invention.

As illustrated, air data system 20 includes pitot-static probes 22-1 and 22-2, for example mounted on opposite sides of the forward end of helicopter 10. While in some embodiments a single pitot-static probe 22 can be used, two or more pitot-static probes are typically used for redundancy and other purposes. The pitot-static probes 22-1 and 22-2 measure static pressure Ps and total pressure Pt.

Air data system 20 also includes two ADCs 24-1 and 24-2, for redundancy purposes, and a flight control or mission computer 202. The air data computers 24-1 and 24-2 are pneumatically plumbed to the pitot-static probes. The air data computer measures these pressures using various pressure sensors. Each ADC receives at least one total pressure Pt and at least one differential static pressure Ps as an input. In other embodiments, multi-function probes (MFPs) or Smart Probes are used. In these embodiments, the MFPs can be electrically coupled to the ADC instead of pneumatically. The illustrations of the invention represent both of these alternative embodiments.

As described above with reference to FIG. 1, each pitot-static probe can include two separate static pressure sensing ports for differential static pressure measurement. In FIG. 3, the two static pressure sensing ports (and the pressures sensed by these ports) for each of probes 22-1 and 22-2 are labeled S1 and S2. In one embodiment, the first static pressure sensing port S1 from probe 22-1 is pneumatically plumbed with the second static pressure sensing port S2 from probe 22-2, while the second static pressure sensing port S2 from probe 22-1 is pneumatically plumbed with the first static pressure sensing port S1 of probe 22-2. These two differential pressures are each plumbed to a different one of ADCs 24-1 and 24-2. However, in other embodiments, the static pressure sensing ports can be pneumatically connected in different ways, for example, with the S1 and S2 ports of each individual probe connected together. In embodiments using MFPs, instead of pneumatic plumbing, the various pressures can be electrically averaged or processed. ADCs 24-1 and 24-2 can also receive input from other input devices, for example from a temperature probe 201 mounted on the helicopter.

The electronics in the ADCs 24-1 and 24-2 covert the pressures to analog signals, and then to digital signals. Embedded software in the ADCs uses the raw digital signals to filter the data and calculate various air data parameters. The ADCs 24-1 and 24-2 calculate impact (differential) pressure Qc by subtracting the static pressure Ps from the total pressure Pt. Each of ADCs 24-1 and 24-2 output its calculated data over a corresponding communications bus 204-1, 204-2, such as ARINC 429 or MIL-STD-1553B communication buses. Mission computer 202 uses this data in its own calculations, and transmits some, or all of it to the multi-function or cockpit display(s) 26, which display the information to the pilot(s) of the aircraft.

In accordance with embodiments of the present invention, a method of estimating airspeed of an aircraft during low airspeed conditions is disclosed. As is illustrated in step 505 of the flow diagram 500 shown in FIG. 5, the method first includes measuring a negative impact pressure using a pitot-static probe on the aircraft. Measuring a negative impact pressure includes the steps necessary to calculate the negative impact pressure using other measured pressures. Using a pitot-static probe on the aircraft includes using one pitot-static probe, using multiple pitot-static probes in combination, and using separate total pressure measuring devices and static pressure measuring devices.

Figure 5:
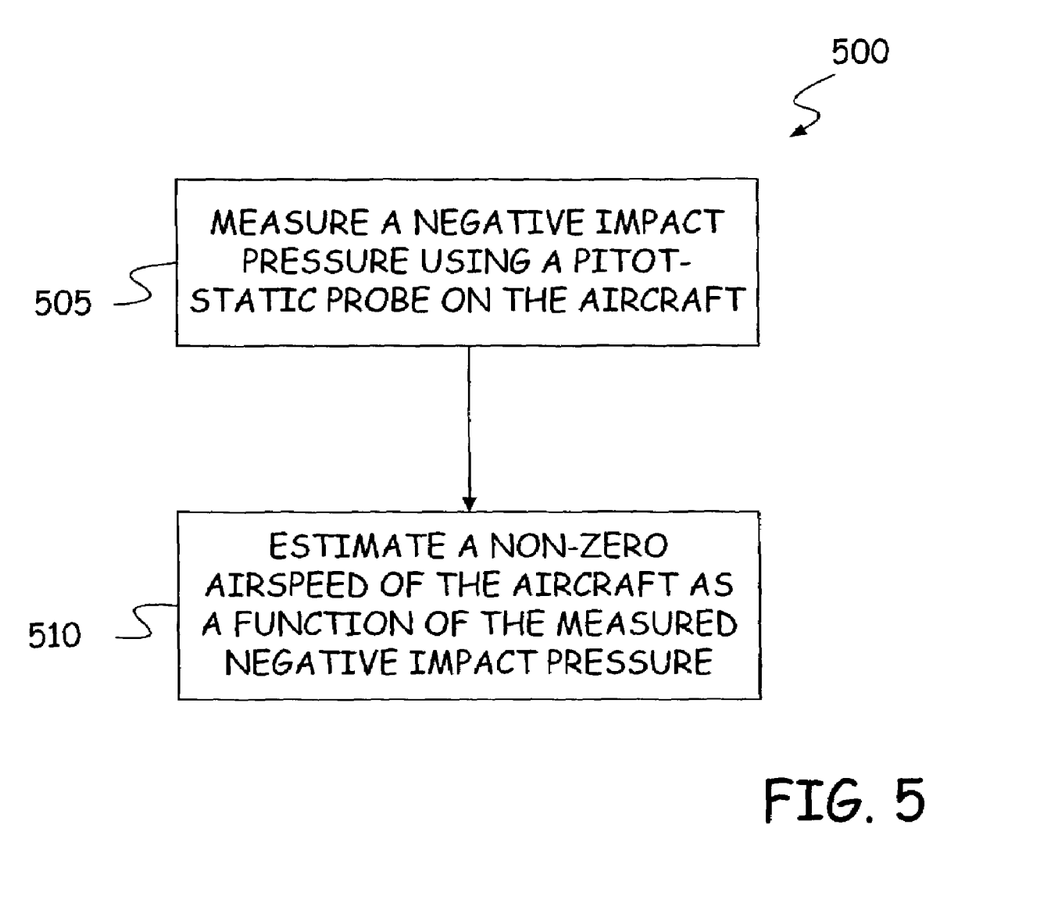
FIG. 5 is a block diagram illustrating a method of estimating airspeed of an aircraft in low airspeed conditions.

Next, as illustrated at step 510 of FIG. 5, the method includes estimating a non-zero airspeed of the aircraft as a function of the measured negative impact pressure. This can be done in a number of different ways which fall within the scope of the invention. Negative impact pressures can be correlated directly to airspeeds of the aircraft, using a curve fit function based upon flight test data taken at known airspeeds for slow flight, take offs, and landings. Using this technique, conventional algorithms for calculating or estimating airspeed from impact pressure are not used until the measured impact pressure is a positive number, and in some embodiments, not until the measured impact pressure exceeds a non-zero positive number threshold in order to suppress the erroneous airspeed data calculated from the uncompensated and unfiltered measured dynamic pressure. While the impact pressure remains negative and below any threshold selected, the LAA algorithm is used to estimate the airspeed directly from the impact pressure.

In other embodiments, the negative impact pressure is correlated, using the same techniques, to a positive impact pressure. The correlated positive impact pressure can then be used in conventional algorithms for calculating or estimating the airspeed of the aircraft. Steps in a method of generating LAA coefficients are described below.

Steps to Calculate LAA

The following steps assume that sufficient flight test data has been acquired in order to provide a representative, or average, data set with which to generate the LAA coefficients for calculating airspeed during conditions in which measured impact pressure is negative. Various flight test methods can be used (fixed airspeed course, trailing airspeed bomb, flight test nose boom, etc.) to collect airspeed (IAS) and impact pressure (Qc) data during low airspeed maneuvers such as takeoffs, landings, hover, ground taxi, and low speed forward flight. The flight test data needs to include the actual data recorded from the air data computer, as well as data recorded from the reference device (the device that is not affected by rotor or aircraft effects, such as the flight test boom, etc). Also, note that since airspeed is calculated from impact pressure using a standard method, this method can be applied to both airspeed and impact pressure data. This example uses airspeed to generate the Low Airspeed Assist coefficients in the following steps. The Low Airspeed Assist coefficients are used in curve fitting measured impact pressure to airspeed or to a corrected impact pressure, as is also discussed below.

1) Once the flight test data is collected, determine the uncorrected airspeed (or impact pressure in the alternative embodiment) as measured from the air data computer 24. The uncorrected airspeed, which is the airspeed calculated using conventional techniques during these low airspeed conditions, is illustrated in the second column of the table shown in FIG. 6A. It is also illustrated in the corresponding curve of the graph in FIG. 6B which plots airspeed (IAS) versus impact pressure (Qc). In the alternative embodiments in which uncorrected impact pressure Qc is to be curve fit, instead of the uncorrected airspeed, the data in the first column of the FIG. 6A table would be used. A corresponding curve isn't shown in the graph of FIG. 6B for uncorrected impact pressure.

2) Evaluate the uncorrected impact pressure point where the actual airspeed was zero and the corresponding negative Qc is most negative, either in a hover or at the start of a takeoff when the weight-on-wheels for the aircraft is zero (FIG. 4). This uncorrected impact pressure reading is the Qc bias. In the following example the Qc bias was −0.2067 inches of Mercury (inHg). This Qc bias is then subtracted from the uncorrected impact pressure to calculate biased impact pressure (FIG. 6A, Step 2—shown in the fourth column).

3) Next, evaluate the actual airspeed (or impact pressure) from the reference measurement. Plot the reference airspeed against the biased impact pressure to yield the target airspeed. This is illustrated in the fifth column (step 3) of the table shown in FIG. 6A, and in the corresponding target airspeed curve in the graph of FIG. 6B. The target airspeed is the airspeed that the air data computer should have been reading if there were no rotor downwash effects. An appropriate curve fit is applied to fit the target airspeed versus biased impact pressure. Depending on the required accuracy, a polynomial fit can be generated, as in this example (FIG. 6A, Step 3), or any other mathematical estimations, such as a logarithmic fit, an exponential fit, etc. The result is a set of curve fit coefficients.

Figure 6A:
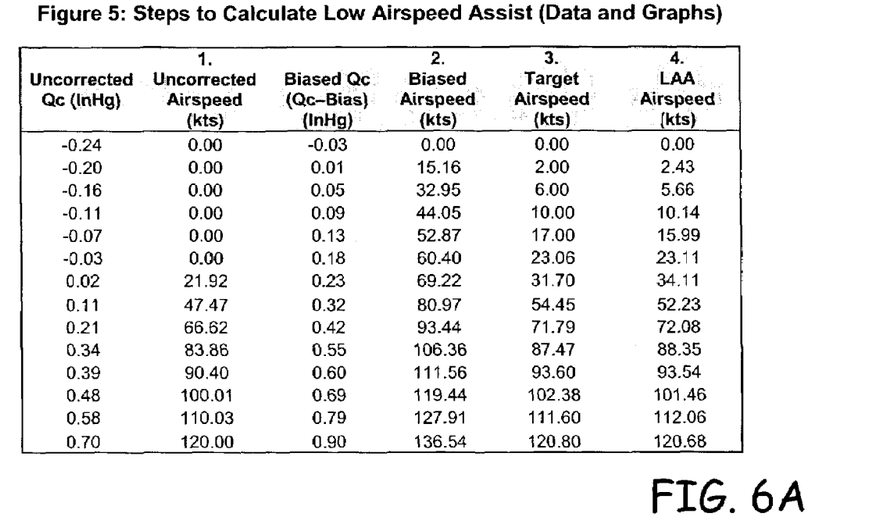
FIGS. 6A and 6B are a table and a graph, respectively, which together illustrate steps of a method to calculate low airspeed assist coefficients in accordance with an example embodiment of the present invention.
Figure 6B:
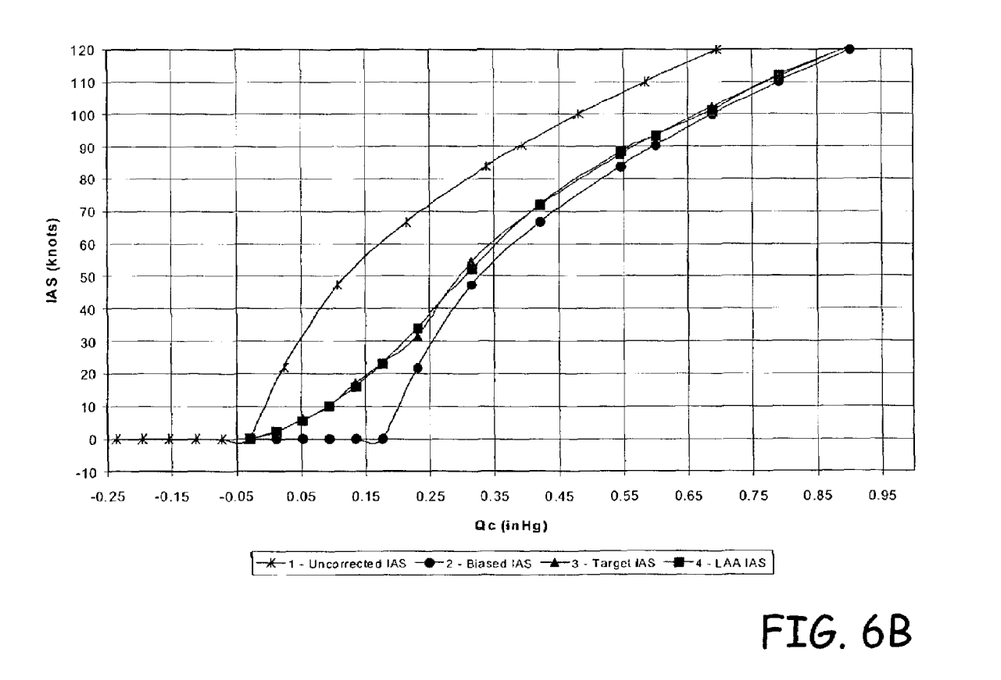

4) Finally, apply the new curve fit coefficients to the LAA equation, and calculate the new LAA airspeed using the uncorrected impact pressure (FIG. 6A, step 4—shown in the sixth column). In this example, the $6^{th}$ order polynomial curve fit was used as shown in Equation 1.

$$IAS = (A \times (Q_C + Q_{C_{BIAS}})^6) + (B \times (Q_C + Q_{C_{BIAS}})^5) + (C \times (Q_C + Q_{C_{BIAS}})^4) + (D \times (Q_C + Q_{C_{BIAS}})^3) + (E \times (Q_C + Q_{C_{BIAS}})^2) + (F \times (Q_C + Q_{C_{BIAS}})) + G \quad \text{Equation 1}$$

where,

IAS is the indicated airspeed;

$QC_{Bias}$ is the Qc bias as determined above; and

A-G are the curve fit coefficients as determined above.

Using a polynomial (or other) curve fit such as the one shown in Equation 1, the LAA equation estimates airspeeds directly as a function of the uncorrected measured impact pressure. The curve fit equation can then be used until the impact pressure is positive, and optionally until it exceeds a threshold value, at which point conventional airspeed as a function of impact pressure equations can be used. For example, if experiments show that calculated airspeed using actual measured impact pressure becomes accurate at some particular non-zero positive value, that value can be used as such a threshold.

As mentioned above, in other embodiments, steps analogous to those described above can be used to generate a curve fit equation which relates uncorrected measured impact pressure to corrected impact pressure. Thus, negative impact pressure values result, using the equation, in positive corrected impact pressure values. Then, using the corrected impact pressure values in place of the measured impact pressure values, conventional airspeed as a function of impact pressure equations can be used.

Although the present invention has been described with reference to preferred embodiments, workers skilled in the art will recognize that changes may be made in form and detail without departing from the spirit and scope of the invention. For example, while the present invention is described as a method of estimating airspeed of an aircraft during low airspeed conditions, the phrase "low airspeed conditions" is intended to represent any flight condition or maneuver of a rotorcraft which results in a negative impact pressure being measured or calculated.

Further, while the present invention is described as a method implemented in an ADC or system using pressures sensed by one or more pitot-static probes, some or all of the method can be implemented elsewhere. For example, multi-function pitot-static probes having processing circuitry in an electronics housing attached to the probe can be used to sense the static and total pressures. The processing circuitry attached to these probes can then perform some or all of the steps of the method. In other words, the multi-function probe can itself be some or all of an ADC with respect to implementation of the invention.

What is claimed is:

1. A method of estimating airspeed of an aircraft during low airspeed conditions, the method comprising:
   measuring a negative impact pressure using at least one pitot-static probe on the aircraft; and
   estimating a non-zero airspeed of the aircraft as a function of the measured negative impact pressure and as a function of an impact pressure bias.

2. The method of claim 1, wherein the impact pressure bias is an uncorrected impact pressure when an actual airspeed of the aircraft is zero.

3. The method of claim 2, wherein the impact pressure bias is an uncorrected impact pressure when the actual airspeed of the aircraft is zero during a maneuver which results in a weight-on-wheels for the aircraft being zero.

4. The method of claim 1, wherein estimating the non-zero airspeed of the aircraft further comprises estimating the non-zero airspeed of the aircraft using a curve fit equation which relates negative impact pressure values directly to non-zero airspeed values.

5. A method of estimating airspeed of an aircraft during low airspeed conditions, the method comprising:
   measuring a negative impact pressure using at least one pitot-static probe on the aircraft; and
   estimating a non-zero airspeed of the aircraft as a function of the measured negative impact pressure, wherein estimating the non-zero airspeed of the aircraft further comprises:
   calculating a positive corrected impact pressure value as a function of the measured negative impact pressure value; and
   estimating the non-zero airspeed of the aircraft as a function of the positive corrected impact pressure value.

6. An air data system for an aircraft, the air data system comprising:
   means for sensing static pressure and total pressure;
   an air data computer configured to determine impact pressure from the sensed static pressure and total pressure, the air data computer being further configured to estimate non-zero airspeeds of the aircraft as a function of determined negative impact pressures and of an impact pressure bias.

7. The air data system of claim 6, wherein the impact pressure bias is an uncorrected impact pressure when an actual airspeed of the aircraft is zero.

8. The air data system of claim 7, wherein the impact pressure bias is an uncorrected impact pressure when the actual airspeed of the aircraft is zero during a maneuver which results in a weight-on-wheels for the aircraft being zero.

9. The air data system of claim 6, wherein the air data computer is further configured to estimate the non-zero airspeed of the aircraft using a curve fit equation which relates negative impact pressure values directly to non-zero airspeed values.

10. The air data system of claim 6, wherein the air data computer is further configured to estimate the non-zero airspeeds of the aircraft by calculating a positive corrected impact pressure value as a function of the measured negative impact pressure value, and estimating the non-zero airspeed of the aircraft as a function of the positive corrected impact pressure value.

11. The air data system of claim 6, and further comprising at least one pitot-static probe providing the means for sensing static pressure and total pressure.

* * * * *